United States Patent Office 2,891,940
Patented June 23, 1959

2,891,940
NEW MONOAZO-DYESTUFFS AND THEIR MANUFACTURE

Alfred Fasciati, Bottmingen, Switzerland, assignor to Ciba Limited, Basel, Switzerland, a Swiss firm No Drawing. Application June 27, 1957
Serial No. 668,334

Claims priority, application Switzerland June 29, 1956

10 Claims. (Cl. 260—153)

This invention provides valuable new monoazo-dyestuffs which contain a halogenated triazine residue. These new monoazo-dyestuffs contain at least two acid groups imparting solubility in water and correspond to the formula (1)  X—D—N=N—A in which A represents the residue of a keto-methylene-compound bound to the azo linkage in a position vicinal to an enolised or enolisable keto group, and X represents a dihalogen-triazine residue of the formula

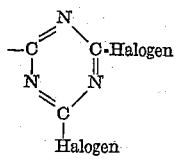

bound through a nitrogen bridge to the residue D of a diazo-component, at least one of the residues D and A containing a bicyclic aromatic nucleus.

As acid groups imparting solubility in water there come into consideration sulfone or sulfonic acid amide groups imparting solubility in water and advantageously strongly ionisable groups imparting solubility in water, such as carboxylic acid or sulfonic acid groups. These groups may be distributed in any manner in the dyestuff molecule. Thus, two such groups may be present in one of the dyestuff components used for making the dyestuffs, and the other dyestuff component may be free from such groups, or both dyestuff components may each contain at least one carboxylic acid or sulfonic acid group.

In addition to at least two such groups and a bicyclic aromatic nucleus the dyestuffs of the Formula 1 contain a dihalogen-triazine residue of the aforesaid formula, and advantageously a dichloro-triazine residue of the formula

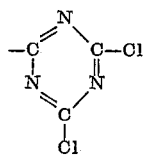

which is bound to the residue of the diazo-component through a nitrogen bridge, and preferably through a nitrogen bridge of the formula

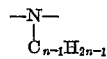

in which $n$ is a positive whole number and at most 5. The

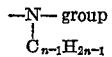

group may be connected to the diazo component through a —SO$_2$— group or advantageously directly. A diazo-component containing such a halogen-triazine residue can be made by methods in themselves known from 1 molecular proportion of cyanuric chloride and 1 molecular proportion of an aromatic compound, which contains, in addition to a reactive hydrogen atom bound to a nitrogen atom, a substituent convertible into an amino group, for example, a nitro group, which is converted into a free amino group after the reaction with syanuric chloride. However, especially valuable on account of their easy accessibility are the diazo-components of this kind obtainable from 1 molecular proportion of syanuric chloride and 1 molecular proportion of an aromatic diamine. As aromatic diamines there may be used bicyclic aromatic compounds or monocyclic diamines, these latter being combined only with such ketomethylene coupling components as contain an at least bicyclic aromatic nucleus.

The condensation of the aforesaid aromatic compounds with cyanuric chloride is advantageously carried out in the presence of an acid-binding agent, such as sodium acetate or sodiumcarbonate. The condensation is carried out in such manner that two of the three exchangeable chlorine atoms remain, for example, by working in a weakly acid to neutral medium and/or at as low a temperature as possible.

As examples of amines obtainable in this manner, and whose diazo-compounds are used as starting materials, there may be mentioned:

The primary condensation products of 1 mol of syanuric chloride with 1 mol of 4:4'-diaminodiphenyl-3-sulfonic acid, 4:4'-diaminostilbene-2:2'-disulfonic acid, 4-(4'-aminobenzoylamino)-1 - aminobenzene - 2 - sulfonic acid, 4 - (4'-aminobenzoylamino)-2-aminobenzene-1-sulfonic acid, 4-(3'-aminobenzoylamino)-1-aminobenzene-2-carboxylic acid, which condensation products can be combined also with such ketomethylene coupling components as do not contain a bicyclic aromatic nucleus, further the primary condensation products of 1 mol of cyanuric chloride and 1 mol of 1:3- or 1:4-diaminobenzene, 1:4-diaminobenzene-2-carboxylic acid, or 1:3-diaminobenzene-4-sulfonic acid, 1:4-diamino-benzene-3-sulfonic acid or 2-methoxy-1:4-diaminobenzene-5-sulfonic acid, which condensation products are to be combined only with ketomethylene coupling components containing a bicyclic aromatic nucleus.

For making dyestuffs of the Formula 1 the aforesaid primary condensation products are diazotised and coupled with keto-methylene-compounds which owe their capacity to coupling to the presence of an enolisable or enolised keto group.

As coupling components of this kind there may be mentioned, β-keto-carboxylic acid amides capable of coupling in the α-position, for example, acetoacetic acid or acetoacetic acid arylides, and above all heterocyclic keto-methylene compounds such as pyrazolones, especially 5-pyrazolones, which are capable of coupling in the 4-position, for example, 3-methyl-5-pyrazolone, 1-phenyl-3-methyl-5-pyrazolone, 1-phenyl-3-methyl-5-pyrazolone-2'- or -3'- or -4'-sulfonic acid, 1-phenyl-5-pyrazolone-3-carboxylic acid, 1-(2'-chloro-phenyl)-3-methyl-5-pyrazolone-5'-sulfonic acid, 1-(3'-nitrophenyl)-5-pyrazolone-3-carboxylic acid, 1-(2':5'-dichloro-phenyl)-3-methyl-5-pyrazolone-4'-sulfonic acid, 1-(2':5'-dichlorophenyl)-5-pyrazolone-3-carboxylic acid-4'-sulfonic acid and the corresponding pyrazolone-3-carboxylic acid amides, further 5-pyrazolones containing a bicyclic aromatic nucleus such as the following:

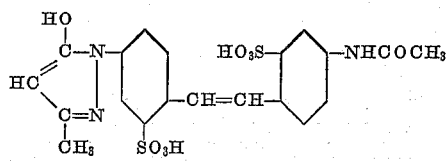

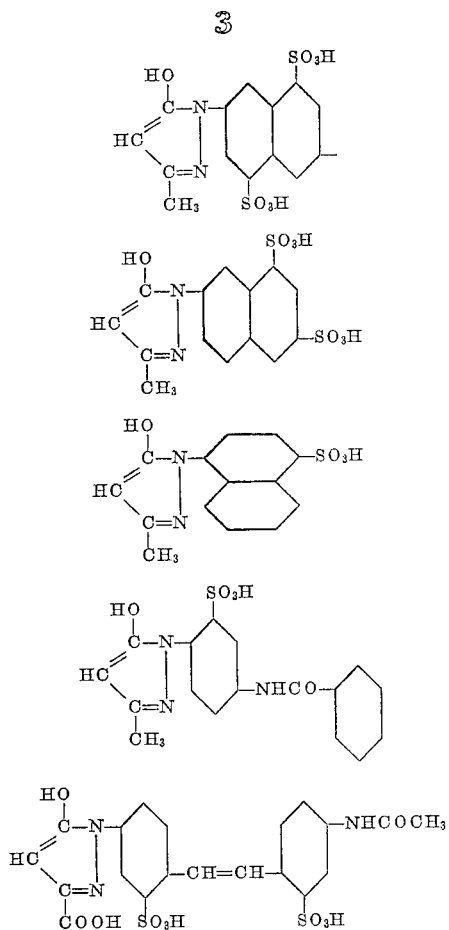

The diazo- and ketomethylene-compounds must be so selected that the dyestuffs formed contain in addition to the halogen-triazine residue at least two acid groups imparting solubility in water and at least one bicyclic aromatic nucleus.

The diazotisation of the amines used as starting materials in the process of this invention can be carried out by methods in themselves known, for example, with the aid of a mineral acid, especially hydrochloric acid, and sodium nitrite. The diazo-compounds so obtained are coupled with the aforesaid coupling components under conditions such that the exchangeable halogen present in the starting material does not react, that is to say, advantageously in a weakly acid to very weakly alkaline medium and at as low a temperature as possible.

In a modification of the process the aforesaid triazine residue is not introduced into the diazo-component used as starting material, but is introduced into the finished azodyestuff, which contains in the residue of the diazo-component a reactive hydrogen atom bound to a nitrogen atom and corresponds to the Formula 2 D—N=N—A in which D represents the residue of an advantageously bicyclic diazo-component and A represents the residue of a keto-methylene compound bound to the azo-linkage in a position vicinal to an enolised or enolisable keto group, and in which D and A together contain at least two groups imparting solubility in water and a bicyclic aromatic nucleus.

The dyestuffs of the Formula 2 can be made by methods in themselves known, for example, by coupling a coupling component of the kind mentioned above with a diazo-compound of a monoacylated amine of the kind mentioned above for preparing the primary cyanuric chloride condensation products and so choosing the starting material that either the diazo- and/or the coupling component contains a bicyclic aromatic nucleus.

Condensation of the finished dyestuffs with the cyanuric trihalides is also carried out in such manner that only one of the three halogen atoms is exchanged.

It is especially advantageous to introduce the halogen-triazine residue into the finished dyestuffs when the dyestuffs are to be made with coupling components that couple in a relatively strongly alkaline medium. In this manner the risk of subjecting the two remaining halogen atoms of the triazine nucleus to a strongly alkaline medium can easily be avoided by carrying out the condensation with the cyanuric chloride in a weakly alkaline to weakly acid medium, after the dyestuff has been produced in a strongly alkaline medium.

The dyestuffs can be isolated from the medium in which they are produced, for example, by salting out and filtration. They can be dried or worked up into dry preparations, if desired, after the addition of a buffer, for example, a mixture of equal parts of a monoalkali phosphate and dialkali phosphate. Owing to the presence of the labile halogen atoms in the molecule it is desirable to carry out the drying cautiously, for example, at not too high a drying temperature and, if desired, under reduced pressure. By spray drying the whole mixture containing the dyestuff and resulting from its preparation, it is usually possible to obtain dry preparations directly, that is to say, without the intermediate isolation of the dyestuff.

By the processes described above there are obtained valuable new monoazo-dyestuffs which contain at least two groups imparting solubility in water and correspond to the above general Formula 1.

The new dyestuffs are suitable for dyeing or printing a very wide variety of material, especially cellulosic fibrous materials, such as cellulose pulp, linen, regenerated cellulose and especially cotton. They are especially suitable for dyeing by the so-called cold dyeing process, in which dyeing is carried out at a temperature ranging from room temperature to a moderately raised temperature in an aqueous alkaline bath which may contain a salt.

The dyestuffs of the invention which are applied to materials to be dyed by the direct dyeing method from strongly saliferous baths or by the printing or foularding method, can be fixed on the material by treatment with alkali and, if desired, with heat.

Dyeings produced with the new dyestuffs on cellulosic fibers are in general distinguished by the purity of their tints, by their good fastness to light and above all by their excellent fastness to washing.

The following examples illustrate the invention, the parts and percentages being by weight unless otherwise stated and the relationship of parts by weight to parts by volume being the same as that of the kilogram to the liter:

*Example 1*

33.6 parts of the primary condensation product from 1 mol of cyanuric chloride and 1 mol of 1:3-diaminobenzene-4-sulfonic acid are stirred in 300 parts of water, 300 parts of ice and 25 parts of hydrochloric acid of 30% strength and diazotised at 0–2° C. with 25 parts by volume of a 4 N-solution of sodium nitrite. Sodium bicarbonate is added to the resulting diazo-suspension, till the pH is 7–7.5, and then the mixture is added to a solution, cooled to 0–2° C., obtained by suspending 39.5 parts of 1-naphthyl-(2')-3-methyl-5-pyrazolone-4',8'-disulfonic acid in 400 parts of water, neutralizing till a pH value of 7–7.5 is attained and adding 15 parts of sodium bicarbonate. When the coupling is finished the dyestuff is precipitated by the addition of potassium chloride, filtered off, washed with sodium chloride solution and dried at 30° C. in vacuo. It dissolves easily in cold water and dyes cellulose fibers at 25–35° C. from an alkaline bath containing sodium chloride pure yellow tints having remarkably good properties of wet fastness and fastness to light.

In the same manner there are obtained from the primary condensation products given in column I of the following table and the coupling components given in column II, dyestuffs which dye cotton the tints given in column III.

Example 2

58.3 parts of the amino-azo-dyestuff, obtained by coupling diazotised 4-acetylamino-2-aminobenzene-1-sulfonic acid with 1-naphthyl-(2')-3-methyl-5-pyrazolone-5',7'-disulfonic acid in an alkaline medium followed by acid hydrolysis of the acetyl group, are dissolved in 2000 parts of water. The solution so obtained is run into a suspension of 18.4 parts of cyanuric chloride cooled to 0–2° C. The whole is stirred at 0–2° C. and a sodium carbonate solution of 10% strength is slowly introduced dropwise until the reaction is neutral and free amino groups can no longer be detected.

The dyestuff is then precipitated by the addition of potassium chloride, filtered off, and dried in vacuo at 30–35° C.

The dyestuff so formed dyes cellulose fibers from an alkaline salt-containing bath at 20–40° C. fast pure yellow tints.

Example 3

2 parts of the dyestuff obtained as described in the first paragraph of Example 1 are dissolved in the cold in 2000 parts of water. Into the resulting dye bath are entered 100 parts of well wetted cotton yarn at 20–45° C. In the course of 30 minutes there are added in portions 500 parts of a sodium chloride solution of 20% strength and 200 parts of trisodium phosphate solution of 10% strength. Dyeing is continued for a further 60 minutes at 20–45° C. After being rinsed with cold water, the dyeing so obtained is soaped for 15 minutes at 85–100° C., and then thoroughly rinsed with cold water and dried. There is obtained a pure yellow dyeing of very good fastness to light and washing.

| | I<br>Diazo-components | II<br>Coupling components | III<br>Dyeing on cotton |
|---|---|---|---|
| 1 | Dichlorotriazinyl-NH-C$_6$H$_4$(SO$_3$H)-NH$_2$ | 3-methyl-1-(naphthyl-SO$_3$H)-5-pyrazolone | greenish yellow. |
| 2 | Dichlorotriazinyl-NH-C$_6$H$_4$(SO$_3$H)-NH$_2$ | 3-methyl-1-[phenyl-SO$_3$H-CH=CH-C$_6$H$_3$(SO$_3$H)(NHCOCH$_3$)]-5-pyrazolone | reddish yellow. |
| 3 | Dichlorotriazinyl-NH-C$_6$H$_4$(SO$_3$H)-NH$_2$ | 3-methyl-1-[phenyl-SO$_3$H-CH=CH-C$_6$H$_3$(SO$_3$H)(NHCOCH$_3$)]-5-pyrazolone | greenish yellow. |
| 4 | Dichlorotriazinyl-NH-C$_6$H$_3$(SO$_3$H)-C$_6$H$_3$(SO$_3$H)-NH$_2$ | 3-methyl-1-(dichloro-SO$_3$H-phenyl)-5-pyrazolone | reddish yellow. |

| | I Diazo-components | II Coupling components | III Dyeing on cotton |
|---|---|---|---|
| 5 | Cl-C(=N-)C(-NH-C₆H₄-CO-NH-C₆H₃(-SO₃H)-NH₂)=N-CH=N-C(Cl)= (dichlorotriazinyl-amino-benzoylamino-aminobenzenesulfonic acid) | 1-(4-chlorophenyl)-3-methyl-5-pyrazolone (CH₂—C—CH₃ / O=C / N—C₆H₄—Cl) with SO₃H | yellow. |
| 6 | Cl-N=C(-NH-C₆H₃(-SO₃H)(-NH₂))-N=CH-N=C(Cl)- (dichlorotriazinylamino-aminobenzenesulfonic acid) | 1-(sulfonaphthyl)-3-carboxy-5-pyrazolone (CH₂—C—COOH / O=C / N—naphthyl—SO₃H) | greenish yellow. |
| 7 | Cl-C(=N-)C(-NH-C₆H₃(-SO₃H)(-NH₂))=N-CH=N-C(Cl)= | O=C—CH₃, H₃C—CO—NH—C₆H₃(SO₃H)(NHCO—C₆H₅) (acetoacetylamino-benzoylamino-benzenesulfonic acid) | yellow. |
| 8 | Cl-C(=N-)C(-NH-C₆H₃(-SO₃H)(-NH₂))=N-CH=N-C(Cl)= | 1-(disulfonaphthyl)-3-methyl-5-pyrazolone (CH₂—C—CH₃ / O=C / N—naphthyl(SO₃H)₂) | Do. |

Sodium carbonate may be used with equal success, instead of trisodium phosphate.

Example 4

2 parts of the dyestuff obtained as described in the first paragraph of Example 1 are dissolved in admixture with 8 parts of urea in 100 parts of water. A cotton fabric is impregnated with the resulting solution on a foulard at 40° C., and the excess liquid is squeezed from the fabric until it retains 75% of its weight of dyestuff solution. The fabric so impregnated is dried, and then impregnated at room temperature in a solution containing, per liter, 30 grams of sodium carbonate and 300 grams of sodium chloride. The fabric is then squeezed until the absorbed liquid amounts to 75% and steamed for 60 seconds at 100–101° C. The fabric is then rinsed, soaped for ¼ hour in a solution of 0.3% strength of a non-ionic detergent at the boil, again rinsed and dried. There is obtained a brilliant yellow dyeing which is fixed fast to boiling.

Example 5

2 parts of dyestuff No. 1 of the foregoing table are dissolved in 4000 parts of water and 100 parts of bleached soft cellulose pulp is entered. The suspension is stirred for one hour at room temperature, 2 portions each of 80 parts of sodium sulfate being added after 5 and 15 minutes and 40 parts of sodium carbonate being added after 30 minutes.

The cellulose is then filtered with suction on a sieve plate, washed with hot water until the washings are no longer coloured, pressed and dried. There is obtained a strongly yellow coloured paper having very good properties of wet fastness and fastness to light.

A similarly good result is obtained if the sodium carbonate is added at the outset to the dyestuff solution.

What is claimed is:

1. A monoazo dyestuff which contains at least one bicyclic aromatic nucleus selected from the group consisting of the naphthalene, the diphenyl and the stilbene radicals and also contains at least two sulfonic acid groups, said dyestuff in its free acid state corresponding to the formula

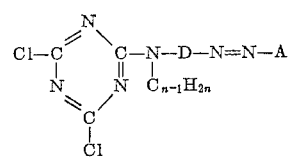

wherein $n$ is a whole positive number up to and including 5, D is an aromatic radical of the benzene series containing in vicinal position to the azo linkage a member selected from the group consisting of a hydrogen atom and a sulfonic acid group, and A represents a member selected from the group consisting of the radical of an acetoacetic acid acrylide and the radical of a 5-pyrazolone, radical A being bound to the azo group in a position vicinal to the keto group, the said bicyclic aromatic nucleus being present in at least one of the radicals A and D.

2. A monoazo dyestuff which contains at least two sulfonic acid groups and which in its free acid state corresponds to the formula

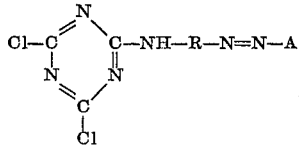

wherein A represents the radical of a 5-pyrazolone bound to the azo linkage in 4-position, and R represents a diphenyl radical containing a sulfonic acid group in vicinal position to the azo linkage.

3. A monoazo dyestuff which contains at least two sulfonic acid groups and which in its free acid state corresponds to the formula

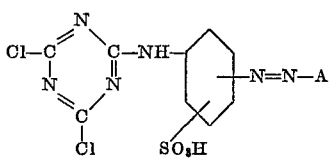

wherein A represents the radical of a 5-pyrazolone bound in 4-position to the azo linkage and bearing in 1-position a naphthalene radical containing a sulfonic acid group.

4. A monoazo dyestuff which contains at least two sulfonic acid groups and which in its free acid state corresponds to the formula

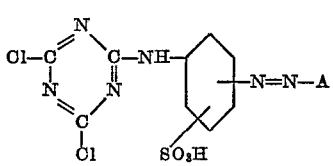

wherein A represents the radical of a 5-pyrazolone bound in 4-position to the azo linkage and bearing in 1-position a stilbene radical containing a sulfonic acid group.

5. A monoazo dyestuff which contains at least two sulfonic acid groups and which in its free acid state corresponds to the formula

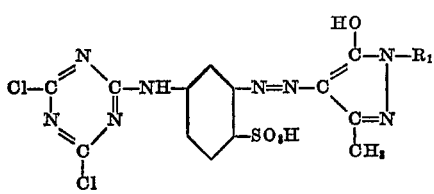

wherein $R_1$ represents the stilbenyl radical containing two sulfonic acid groups.

6. A monoazo dyestuff which contains at least one naphthalene nucleus and at least two sulfonic acid groups and which in its free acid state corresponds to the formula

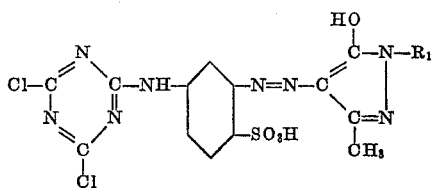

wherein $R_1$ represents the radical of a naphthalene-sulfonic acid.

7. The monoazo dyestuff which in its free acid state corresponds to the formula

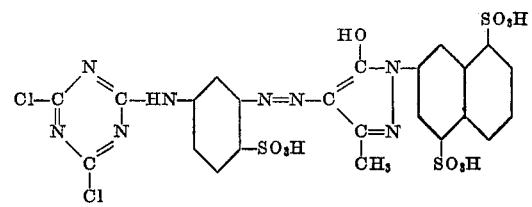

8. The monoazo dyestuff which in its free acid state corresponds to the formula

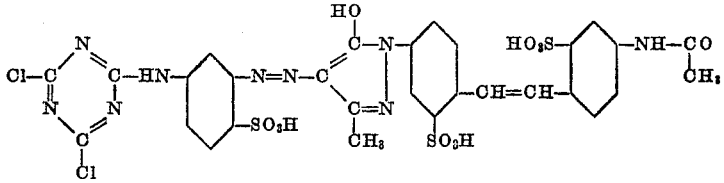

9. The monoazo dyestuff which in its free acid state corresponds to the formula

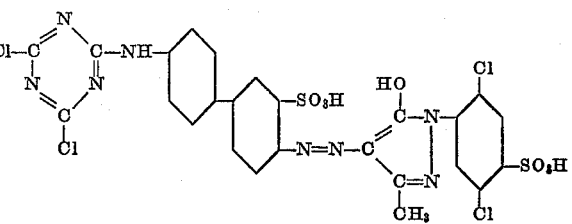

10. The monoazo dyestuff which in its free acid state corresponds to the formula

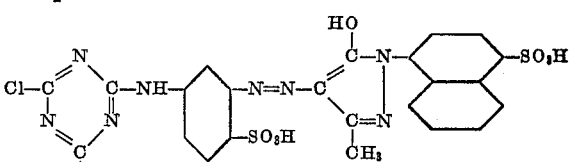

References Cited in the file of this patent
UNITED STATES PATENTS
2,270,478    Schmid _____ Jan. 20, 1942
FOREIGN PATENTS
891,603    France _____ Dec. 11, 1943
OTHER REFERENCES
Boyle: The Industrial Chemist, pp. 331–333, August 1939.